United States Patent
Tsai et al.

(10) Patent No.: US 10,956,183 B2
(45) Date of Patent: Mar. 23, 2021

(54) SYSTEM FOR SETTING A LANGUAGE FOR A DASHBOARD DEVICE OF A VEHICLE

(71) Applicant: Kwang Yang Motor Co., LTD., Kaohsiung (TW)

(72) Inventors: Yi-Yang Tsai, Kaohsiung (TW); Kuo-Chen Wu, Taipei (TW)

(73) Assignee: Kwang Yang Motor Co., LTD., Sanmin District (TW)

( * ) Notice: Subject to any disclaimer, the term of this patent is extended or adjusted under 35 U.S.C. 154(b) by 122 days.

(21) Appl. No.: 16/257,918

(22) Filed: Jan. 25, 2019

(65) Prior Publication Data
US 2019/0250935 A1    Aug. 15, 2019

(30) Foreign Application Priority Data

Feb. 14, 2018   (TW) .................................. 107202387

(51) Int. Cl.
G06F 9/451         (2018.01)
B60K 37/00         (2006.01)

(52) U.S. Cl.
CPC .............. G06F 9/454 (2018.02); B60K 37/00 (2013.01); *B60K 2370/151* (2019.05); *B60K 2370/50* (2019.05)

(58) Field of Classification Search
CPC ...................................................... G06F 9/454
See application file for complete search history.

(56) References Cited

U.S. PATENT DOCUMENTS

| | | | | |
|---|---|---|---|---|
| 7,444,278 B2 * | 10/2008 | Bennett | .................... | G06F 9/454 704/8 |
| 8,897,423 B2 * | 11/2014 | Nanjundaswamy | .......................... | H04M 3/4936 379/88.06 |
| 9,672,208 B2 * | 6/2017 | Patil | ........................ | H04W 4/70 |
| 2004/0210841 A1 * | 10/2004 | Takahashi | .......... | H04N 1/00464 715/265 |
| 2005/0240905 A1 * | 10/2005 | Pournasseh | ............. | G06F 9/454 717/136 |
| 2006/0080358 A1 * | 4/2006 | Blair-Stanek | ........... | G06F 9/454 |
| 2007/0073530 A1 * | 3/2007 | Iso-Sipila | ............... | G06F 9/454 704/3 |

(Continued)

FOREIGN PATENT DOCUMENTS

| | | |
|---|---|---|
| EP | 1211141 A2 | 6/2002 |
| TW | I380229 | 12/2012 |
| WO | 20161060907 A1 | 4/2016 |

OTHER PUBLICATIONS

European Extended Search Report and Opinion for European Application No. 18207974, dated May 17, 2019, 10 pages.

*Primary Examiner* — Douglas Godbold
(74) *Attorney, Agent, or Firm* — TraskBritt

(57) ABSTRACT

A dashboard device of a vehicle includes a storage component and a processor. The storage component stores a plurality of different language packs and a first national table listing a first number of unique language indices associated respectively with the language packs. The processor is coupled to the storage component and is programmed to, in response to receipt of a machine code and a second number related to another plurality of unique language indices from a portable electronic device, use one of the language packs to set language used on the dashboard device based on content of the machine code and a relationship between the first and second numbers.

11 Claims, 9 Drawing Sheets

(56) References Cited

U.S. PATENT DOCUMENTS

| | | | | |
|---|---|---|---|---|
| 2007/0245346 A1* | 10/2007 | Shintoku | | G06F 9/454 717/174 |
| 2009/0083729 A1* | 3/2009 | Kanai | | G06F 9/4411 717/174 |
| 2010/0267376 A1* | 10/2010 | Saari | | G06F 8/38 455/418 |
| 2011/0218812 A1* | 9/2011 | Patel | | G06Q 30/0283 704/277 |
| 2012/0016659 A1* | 1/2012 | Miura | | E02F 9/26 704/8 |
| 2012/0271619 A1* | 10/2012 | Abdel-Kader | | G06F 40/109 704/3 |
| 2013/0145061 A1* | 6/2013 | Parivar | | G06F 9/4415 710/67 |
| 2014/0035928 A1* | 2/2014 | Ohgake | | G06F 40/263 345/467 |
| 2014/0096027 A1* | 4/2014 | Ji | | G06F 3/048 715/744 |
| 2014/0351798 A1* | 11/2014 | Ross | | G06F 9/454 717/137 |
| 2015/0032439 A1* | 1/2015 | Ogawa | | G06F 40/58 704/2 |
| 2015/0277903 A1* | 10/2015 | Wentland | | G06F 8/71 717/121 |
| 2015/0331688 A1* | 11/2015 | Shimizu | | G06F 8/654 717/170 |
| 2016/0092439 A1* | 3/2016 | Ichimi | | G06F 40/109 715/265 |
| 2016/0107577 A1* | 4/2016 | Niles | | B60K 35/00 704/3 |
| 2016/0170959 A1* | 6/2016 | Niles | | G06F 40/263 713/100 |
| 2017/0185579 A1* | 6/2017 | Zhu | | G06F 3/0482 |
| 2017/0279990 A1* | 9/2017 | Xu | | G06F 3/04847 |

* cited by examiner

| Language Index | Language Pack Name |
|---|---|
| 01 | English |
| 02 | Transitional Chinese |
| 03 | Simplified Chinese |
| 04 | German |
| 05 | Spanish |
| 06 | French |
| 07 | Italian |
| 08 | Greek |
| 09 | Japanese |
| 0A | Portuguese |
| 0B | Dutch Language |
| 0C | Korean |
| 0D | Vietnamese |
| 0E | Turkish |
| 0F | Polish |

| Language Index | Language Pack Name |
|---|---|
| 01 | English |
| 02 | Transitional Chinese |
| 03 | Simplified Chinese |
| 04 | German |
| 05 | Spanish |
| 06 | French |
| 07 | Italian |
| 08 | Greek |
| 09 | Japanese |
| 0A | Portuguese |
| 0B | Dutch Language |
| 0C | Korean |
| 0D | Vietnamese |
| 0E | Turkish |
| 0F | Polish |
| 10 | Hebrew |

FIG.3

| Language Index | Language Pack Name |
|---|---|
| 01 | English |
| 02 | Transitional Chinese |
| 03 | Simplified Chinese |
| 04 | German |
| 05 | Spanish |
| 06 | French |
| 07 | Italian |
| 08 | Greek |
| 09 | Japanese |
| 0A | Portuguese |
| 0B | Dutch Language |
| 0C | Korean |
| 0D | Vietnamese |
| 0E | Turkish |
| 0F | Polish |
| 10 | Hebrew |

| Language Index | Language Pack Name |
|---|---|
| 01 | English |
| 02 | Transitional Chinese |
| 03 | Simplified Chinese |
| 04 | German |
| 05 | Spanish |
| 06 | French |
| 07 | Italian |
| 08 | Greek |
| 09 | Japanese |
| 0A | Portuguese |
| 0B | Dutch Language |
| 0C | Korean |
| 0D | Vietnamese |
| 0E | Turkish |
| 0F | Polish |

FIG.7

SYSTEM FOR SETTING A LANGUAGE FOR A DASHBOARD DEVICE OF A VEHICLE

CROSS-REFERENCE TO RELATED APPLICATION

This application claims the benefit of the priority date of Taiwanese Patent Application No. 107202387, filed on Feb. 14, 2018, the disclosure of which is incorporated herein in its entirety by this reference.

FIELD

The disclosure relates to a system that is capable of setting a language used on a dashboard device of a vehicle with simple operations.

BACKGROUND

Taiwanese Patent No. 1380229 discloses a guiding system having radio frequency identification. As shown in FIG. 1, a set 921 of radio frequency identification (RFID) units 9211-9215 are disposed on an object 923 (e.g., a billboard, a display screen, etc.). Each of the RFID units 9211-9215 stores guiding information corresponding to the object in a specific language. For example, the RFID unit 9211 may store guiding information in Mandarin Chinese, the RFID unit 9212 may store guiding information in French, the RFID unit 9213 may store guiding information in English, the RFID unit 9214 may store guiding information in Korean, and the RFID unit 9215 may store guiding information in Japanese. A user may use a handheld device 922 (e.g., an audio player, a mobile phone, etc.) to receive the guiding information of a specific language from one of the RFID units 9211-9215 (e.g., the RFID unit 9214). Afterward, the user may operate the handheld device 922 to play the guiding information in the form of audio using a speaker 927, and/or to display the guiding information using a screen 928.

SUMMARY

One object of the disclosure is to provide a system for setting a language to be displayed by a dashboard device of a vehicle.

According to one embodiment of the disclosure, the system includes a dashboard device included in a vehicle, and a portable electronic device electrically connected to the dashboard device.

The dashboard device includes a storage component that stores a plurality of different language packs and a first national table listing a first number of unique language indices associated respectively with the language packs, and a processor that is coupled to the storage component.

The portable electronic device includes a storage component that stores a second national table listing a second number of unique language indices, and a processor that is electrically connected to the storage component.

The portable electronic device is configured to transmit a machine code and the second number to the dashboard device.

The processor of the dashboard device is programmed to, in response to receipt of the machine code and the second number, use one of the language packs to set language used on the dashboard device based on content of the machine code and a relationship between the first and second numbers.

BRIEF DESCRIPTION OF THE DRAWINGS

Other features and advantages of the disclosure will become apparent in the following detailed description of the embodiments with reference to the accompanying drawings, of which:

FIG. 3 illustrates a first national table stored in the dashboard device and a second national table stored in the portable electronic device, according to one example;

FIG. 7 illustrates a first national table stored in the dashboard device and a second national table stored in the portable electronic device, according to one example;

DETAILED DESCRIPTION

Figure 1:
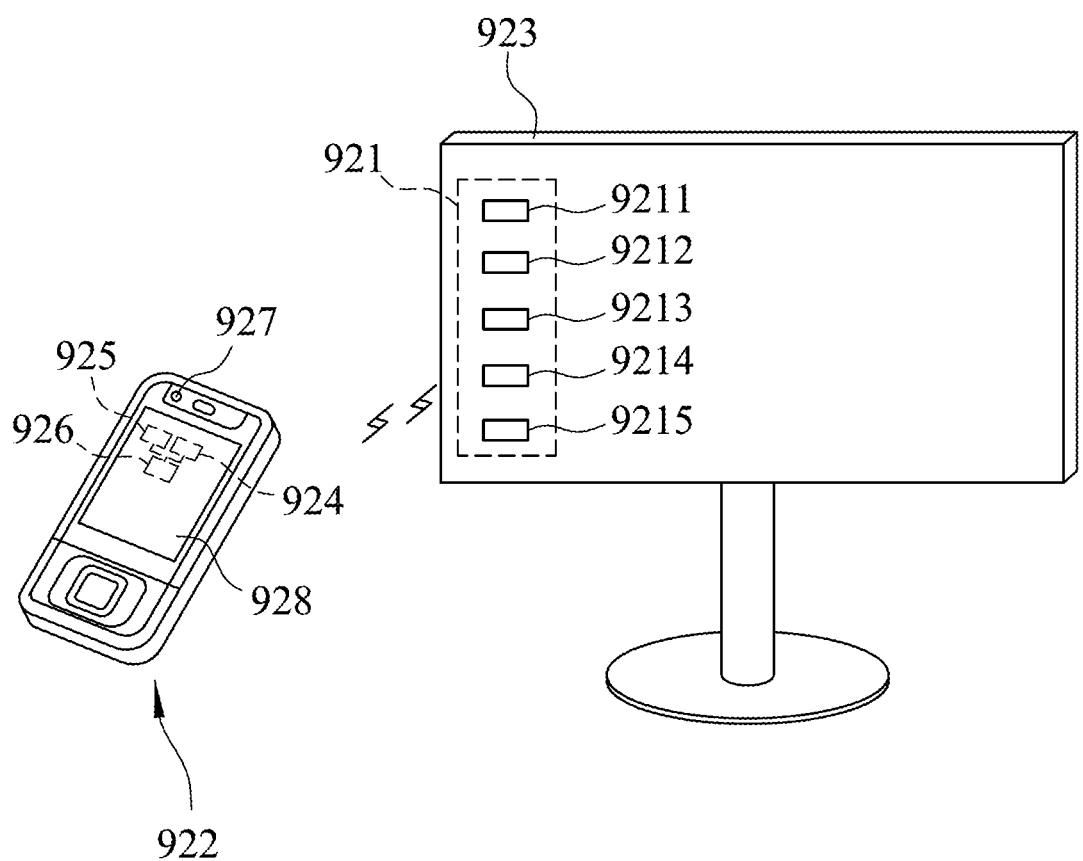
FIG. 1 is a block diagram illustrating a conventional guiding system.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
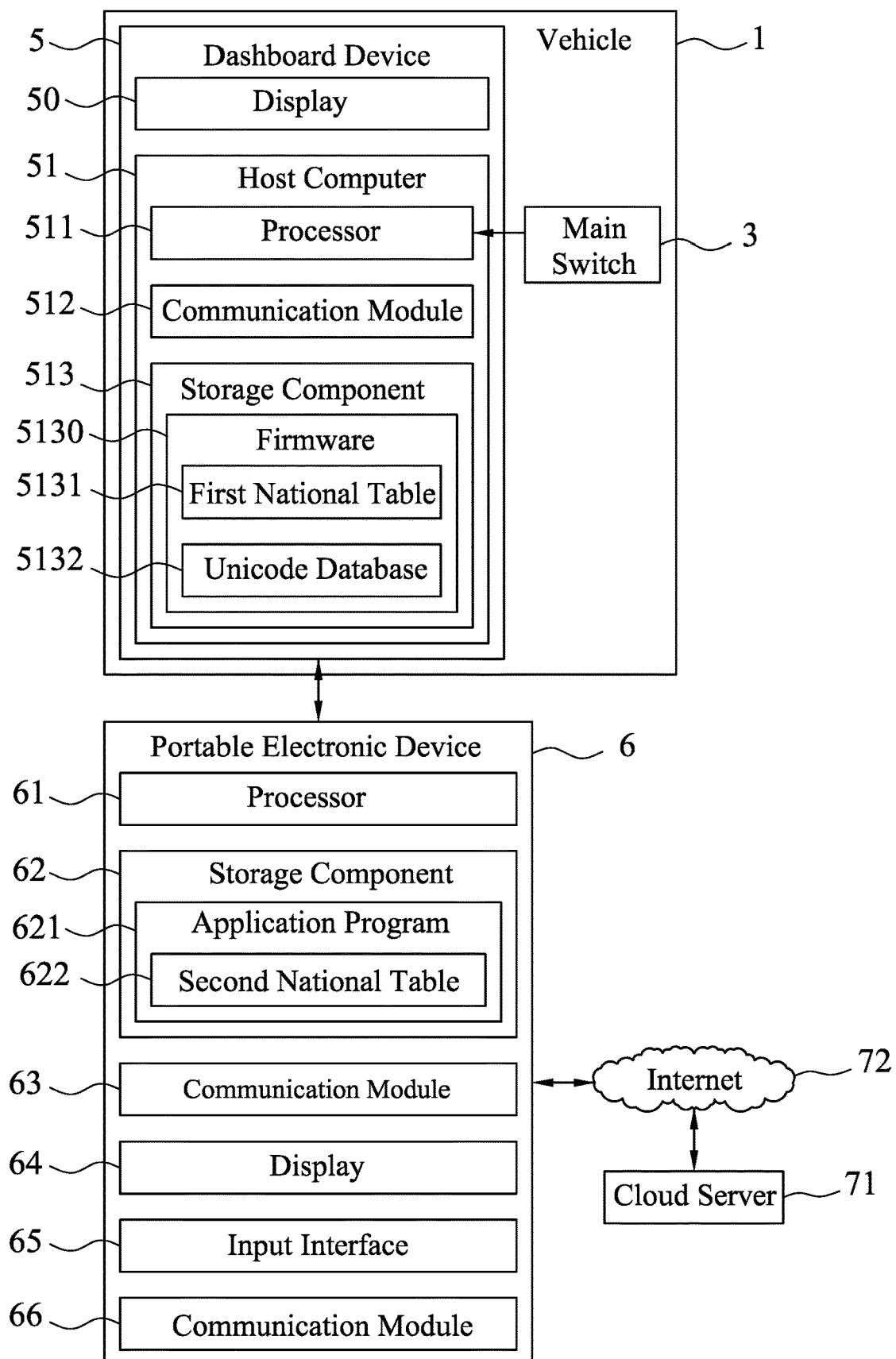
FIG. 2 is a block diagram illustrating a dashboard device communicating with a portable electronic device according to one embodiment of the disclosure.

FIG. 2 is a block diagram illustrating a dashboard device 5 communicating with a portable electronic device 6, according to one embodiment of the disclosure.

The dashboard device 5 may be included in a vehicle 1 (e.g., a motorcycle, an automobile, an all terrain vehicle (ATV), a utility vehicle (UV), a battery electric vehicle (BEV), etc.). The vehicle 1 may further include a main switch 3 that is electrically connected to the dashboard device 5, and that can be operated to power up the vehicle 1.

The dashboard device 5 may be included in a vehicle 1 (e.g., a motorcycle, an automobile, an all-terrain vehicle (ATV), a utility vehicle (UV), a battery electric vehicle (BEV), etc.). The vehicle 1 may further include a main switch 3 that is electrically connected to the dashboard device 5, and that can be operated to power up the vehicle 1.

The processor 511 is electrically connected to the main switch 3 and other components of the dashboard device 5, and may include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), etc.

The communication module 512 may include a short-range wireless communicating module supporting a short-range wireless communication network using a wireless technology of BLUETOOTH® and/or Wi-Fi, etc., and a mobile communicating module supporting telecommunication using Long-Term Evolution (LTE), the third generation (3G) and/or fourth generation (4G) of wireless mobile telecommunications technology, a near field communication (NFC) module, and/or the like.

The storage component 513 may include, but is not limited to, a hard disk, a flash drive, or various forms of non-transitory storage medium. The storage component 513 stores an operating system (OS) and firmware 5130 for the dashboard device 5.

The firmware 5130 includes a first national table 5131 and a Unicode database 5132. As shown in FIG. 3, the first national table 5131 includes a first number of unique language indices (column 5133) associated respectively with a plurality of language packs, a first number of language pack names (column 5134) corresponding respectively with the first number of unique language indices, and a plurality of Unicode ranges corresponding respectively to the first number of unique language indices. The Unicode database 5132 includes a set of characters/symbols, each of the characters/symbols being associated with a unique Unicode code point, which is an integer and is for identifying the associated character/symbol. The language packs can be defined by the Unicode database 5132, each of the language packs covering a subset of the characters in the Unicode database 5132 and including displaying information for a particular language. The subsets covered by two or more language packs may partially overlap. For example, the language index 02 is associated with traditional Chinese, and the associated traditional Chinese language pack includes traditional Chinese characters and associated Unicode code points.

In various embodiments, the first national table 5131 further includes a first number of Unicode code point sets that correspond respectively to the first number of unique language indices, each of the first number of Unicode code point sets including a plurality of Unicode code points corresponding with a plurality of characters/symbols that constitute a corresponding, specific language pack.

In this embodiment, the unique language indices of the first national table 5131 are represented using hexadecimal numeral system, and there are fifteen unique language indices in the first national table 5131 (i.e., the first number mentioned above is fifteen), meaning that the firmware 5130 for the dashboard device 5 supports display in one of fifteen distinct languages. In other embodiments, the unique language indices may be represented using various numeral systems (e.g., binary).

Figure 4:
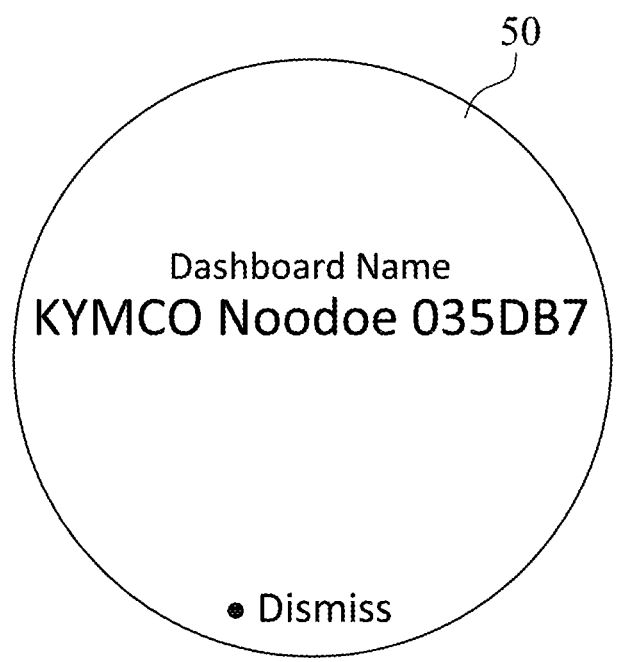
FIG. 4 illustrates an exemplary power-up screen displayed by the dashboard device.

Each of the Unicode ranges represents one or more ranges of Unicode code points that cover all characters/symbols constituting the corresponding, specific language pack. In the case of English language pack (having the language index of "01"), the corresponding Unicode range may include at least a range [0020-007F], which covers the uppercase and lowercase English alphabets and is included in the controls and basic Latin (C0) section of the Basic Multilingual Plane (BMP). For each language pack, the corresponding Unicode code point set may include the Unicode code points of individual characters/symbols within the corresponding Unicode range. For example, in case of the English language pack, the Unicode code point set should contain the association of the Unicode code point "0020" and [SP] representing a space, the association of the Unicode code point "0021" and the symbol "!", etc. Using the content included in one of the Unicode code point sets, the processor 511 is capable of controlling the display 50 to display a power-up screen as shown in FIG. 4.

The portable electronic device 6 may be embodied using a cell phone, a wearable device, a laptop, a tablet, etc., and includes a processor 61, a storage component 62, a communication module 63, a display 64 and an input interface 65.

The processor 61, the storage component 62 and the communication module 63 may be embodied using physical components that are similar to the corresponding components described for the dashboard device 5. The display 64 and the input interface 65 may be integrated into a touch screen.

The storage component 62 stores therein an application program 621 that, when executed by the processor 61, causes the processor 61 to perform operations as described in later paragraphs of the disclosure.

The storage component 62 further stores therein a second national table 622 that is similar to the first national table 5131. The second national table 622 includes a second number of unique language indices (column 623), a second number of language pack names (column 624) corresponding respectively with the second number of unique language indices, and a plurality of Unicode ranges corresponding respectively to the second number of unique language indices. In various embodiments, the second national table 622 further includes a second number of Unicode code point sets corresponding respectively to the second number of unique language indices, each of the second number of Unicode code point sets including a plurality of Unicode code points corresponding with a plurality of characters/symbols that constitute a corresponding, specific language pack.

In this embodiment, the unique language indices of the second national table 622 are represented using the hexadecimal numeral system, and there are sixteen unique language indices in the second national table 622 (i.e., the second number mentioned above is sixteen), meaning that the application program 621 for the portable electronic device 6 supports display in one of sixteen distinct languages. In use, the processor 61 may provide a language selection feature enabling the user to select one of the sixteen distinct languages that is to be used for displaying (see FIG. 5).

Similar to the first national table 5131, each of the Unicode ranges included in the second national table 622 represents one or more ranges of Unicode code points that cover all characters/symbols that constitute a corresponding, specific language pack. In the case of the English language pack (having the language index of 01), the corresponding Unicode range may include at least a range of [0020-007F], which covers the uppercase and lowercase English alphabets and is included in the controls and basic Latin (C0) section of the Basic Multilingual Plane (BMP).

Figure 6:
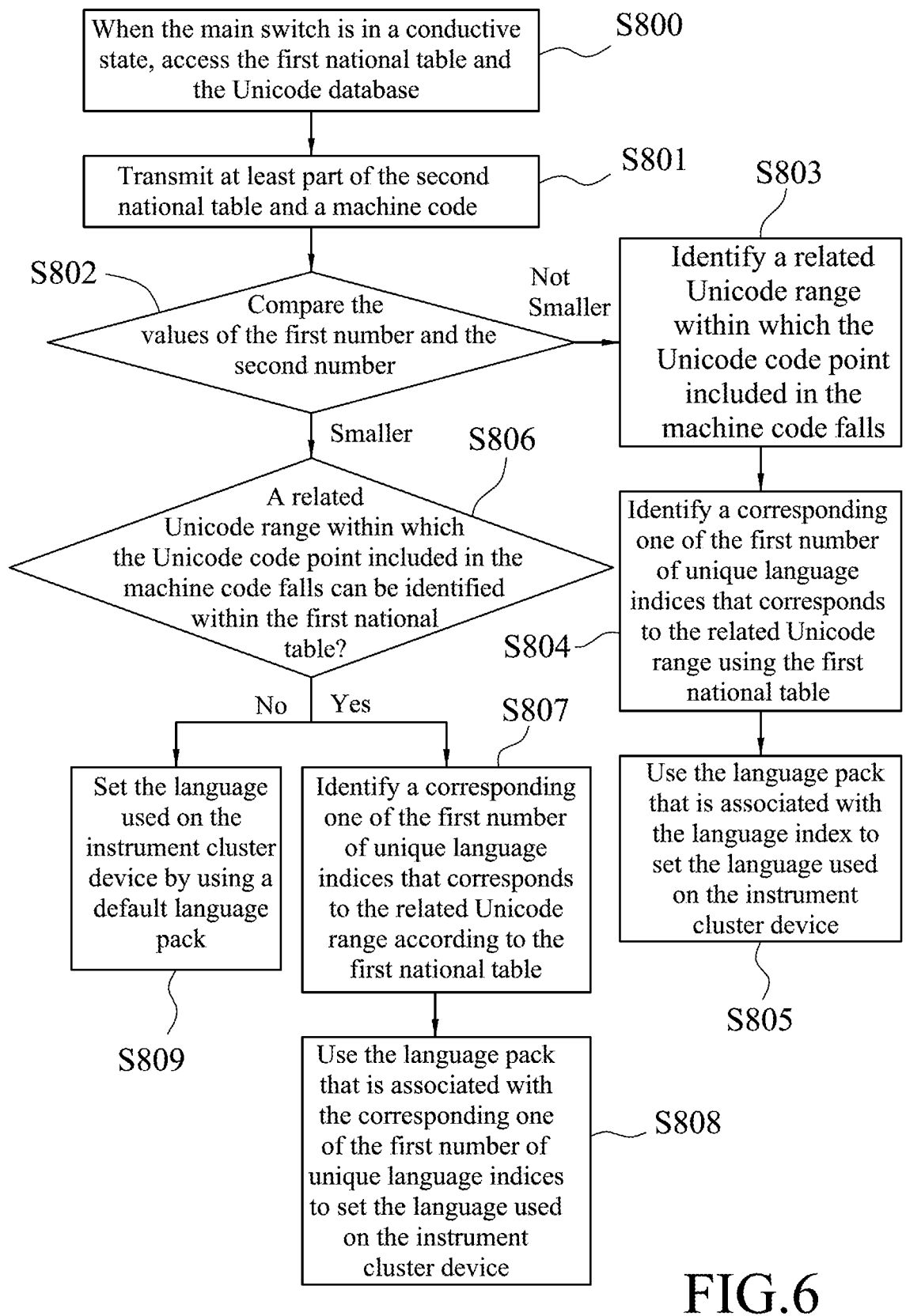
FIG. 6 is a flow chart illustrating steps of a method for setting a language to be used by the dashboard device, according to one embodiment of the disclosure.

FIG. 6 is a flow chart illustrating steps of a method for setting a language to be used by the dashboard device 5, according to one embodiment of the disclosure. The method is implemented by the dashboard device 5 communicating with the portable electronic device 6.

In use, when a user operating the portable electronic device 6 intends to set the language to be used by the dashboard device 5, in step S800, the user may first turn on the main switch 3 of the vehicle 1 (i.e., to switch the main switch 3 to a conductive state, also known as a key-on state), in order to activate the dashboard device 5.

When the main switch 3 is in the key-on state, the processor 511 is capable of accessing the first national table 5131 and the Unicode database 5132, and the communication module 512 of the dashboard device 5 may be controlled by the processor 511 to establish communication between the dashboard device 5 and the portable electronic device 6.

Afterward, in step S801, the processor 61 controls the communication module 63 to transmit at least part of the second national table 622 and a machine code to the dashboard device 5. Specifically, the part of the second national table 622 includes the second number (i.e., the number of entries in column 623), and the machine code in this embodiment includes a Unicode code point associated with a default character.

For example, the default character may be a first character of a default message that corresponds with a specific language pack. In one embodiment, the default message may be "儀表板名稱KYMCO" which corresponds with Traditional Chinese, and the first character is "儀" with the Unicode code point of "5100". In embodiments, the default message may be one that is included in the application program 621 when installed in the portable electronic device 6, or may be inputted by the user into the portable electronic device 6.

In step S802, in response to receipt of the part of the second national table 622 and the machine code, the processor 511 compares the values of the first number and the second number.

It is noted that both the firmware 5130 of the dashboard device 5 and the application program 621 installed in the portable electronic device 6 may be individually updated so a Unicode version included in the firmware 5130 of the dashboard device 5 and the application program 621 installed in the portable electronic device 6 may be different. That is to say, the number of language packs available for each of the dashboard device 5 and the portable electronic device 6 may be expanded. As a result, when a Unicode version of one of the firmware 5130 and the application program 621 is different from that of the other, the numbers of language packs available for the dashboard device 5 and the portable electronic device 6 may be different.

When in step S802, the processor 511 determines that the first number is not smaller than the second number, the flow proceeds to step S803. Otherwise, the flow proceeds to step S806.

When it is determined that the first number is not smaller than the second number, it may be deduced that the firmware 5130 of the dashboard device 5 contains the same number of, if not more, language packs available for displaying as the application program 621 installed in the portable electronic device 6 (see FIG. 7 for an example). In such a case, the processor 511 identifies, in step S803, a related Unicode range within which the Unicode code point included in the machine code falls.

For the character "儀", the corresponding Unicode code point is "5100", which can be found in the Unicode range [4E00-9FFF] (which serves as the related Unicode range), included in CJK Unified Ideographs section of the BMP.

Then, in step S804, the processor 511 identifies a corresponding one of the first number of unique language indices that corresponds to the related Unicode range using the first national table 5131. In this example, the related Unicode range corresponds with the language index "02".

In step S805, the processor 511 uses the language pack that is associated with the language index 02, Traditional Chinese, to set the language used on the dashboard device 5.

When it is determined that the first number is smaller than the second number, it may be deduced that the firmware 5130 of the dashboard device 5 does not contain as many language packs available for displaying as those contained in the application program 621 installed in the portable electronic device 6 (see FIG. 3 for an example). In such a case, the processor 511 determines, in step S806, whether a related Unicode range within which the Unicode code point included in the machine code falls can be identified within the first national table 5131.

When it is determined that a related Unicode range can be identified, the flow proceeds to step S807, in which the processor 511 identifies a corresponding one of the first number of unique language indices that corresponds to the related Unicode range according to the first national table 5131. Afterward, in step S808, the processor 511 uses the language pack that is associated with the corresponding one of the first number of unique language indices to set the language used on the dashboard device 5.

Otherwise, when it is determined that a related Unicode range cannot be identified (e.g., when a Hebrew character is received for the case of FIG. 3), meaning that the firmware 5130 of the dashboard device 5 does not support displaying the default character, the flow proceeds to step S809, in which the processor 511 sets the language used on the dashboard device 5 by using a default language pack (e.g., the English language pack).

In this embodiment, the processor 511 is further configured to, when it is determined that the first number does not equal to the second number, generate an alert for one of the dashboard device 5 and the portable electronic device 6, notifying that new update for the firmware 5130 of the dashboard device 5 or the application program 621 installed in the portable electronic device 6 may be available.

For example, when it is determined that the first number is larger than the second number, the processor 511 may control the display 50 to display an alert message indicating that the application program 621 installed in the portable electronic device 6 should be updated, so as to expand the number of language packs available. In other embodiments, the processor 511 may control the communication module 512 to transmit the alert message to the portable electronic device 6, such that the display 64 of the portable electronic device 6 can display the alert message.

On the other hand, when it is determined that the first number is smaller than the second number, the processor 511 controls the display 50 to display an alert message indicating that the firmware 5130 of the dashboard device 5 should be updated.

The update of the application program 621 or the firmware 5130 may be done by the portable electronic device 6 establishing communication with a cloud server over a network 72 (such as the Internet), and downloading an updated version of the application program 621 or the firmware 5130. For updating the firmware 5130, the portable electronic device 6 further transmits the updated version of the firmware 5130 to the dashboard device 5.

Figure 8:
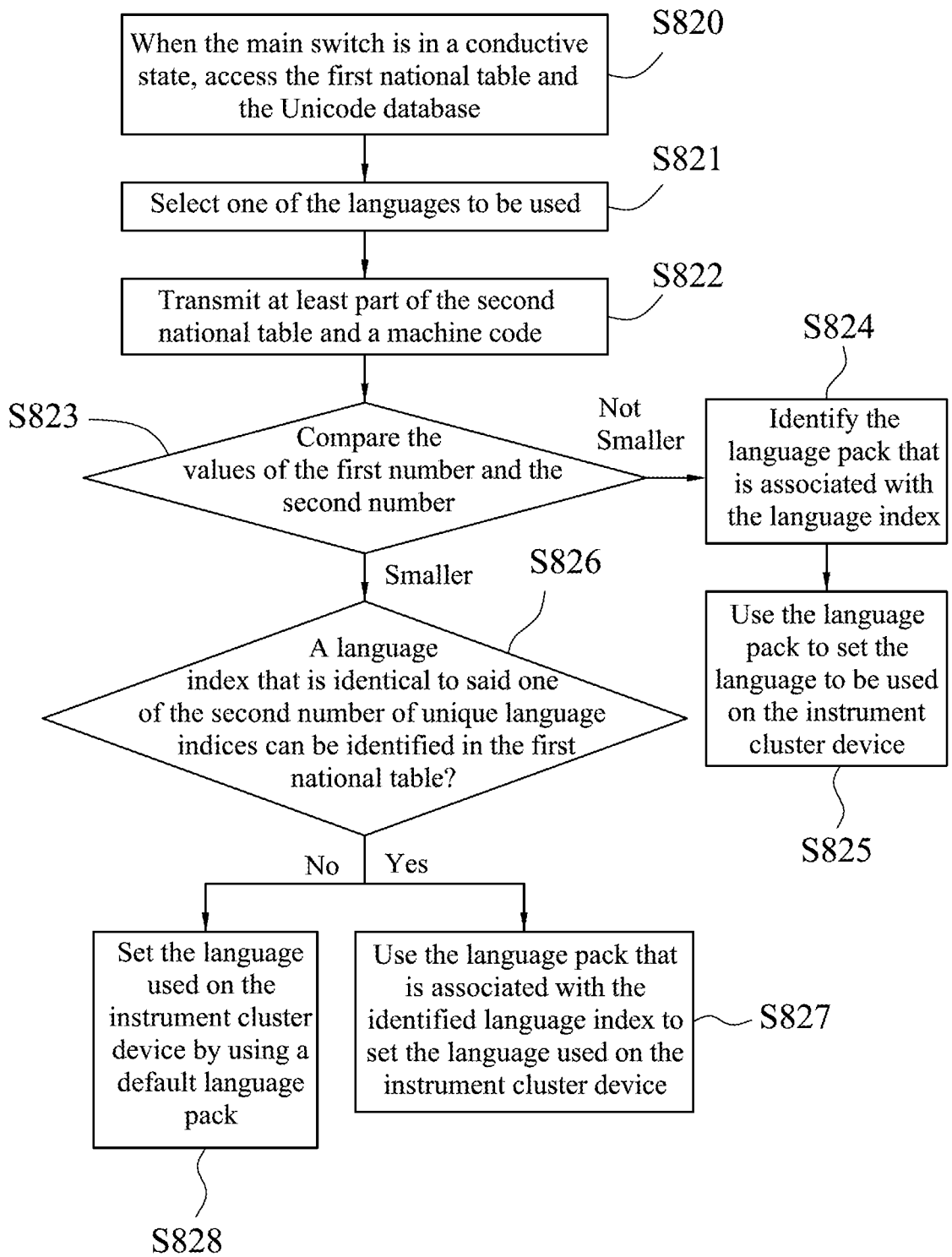
FIG. 8 is a flow chart illustrating steps of a method for setting a language to be used by the dashboard device, according to one embodiment of the disclosure.

FIG. 8 is a flow chart illustrating steps of a method for setting a language to be used by the dashboard device 5, according to one embodiment of the disclosure. The method is implemented by the dashboard device 5 communicating with the portable electronic device 6.

In use, when a user operating the portable electronic device 6 intends to set the language to be used by the dashboard device 5, in step S820, the user may first turn on the main switch 3 of the vehicle 1 (i.e., to switch the main switch 3 to a conductive state, also known as a key-on state), in order to activate the dashboard device 5.

When the main switch 3 is in the key-on state, the processor 511 is capable of accessing the first national table

5131 and the Unicode database 5132, and the communication module 512 of the dashboard device 5 may be controlled to establish communication between the dashboard device 5 and the portable electronic device 6.

Figure 5:
FIG. 5 illustrates a language selection feature provided by the portable electronic device.

Then, in step S821, the user operates the portable electronic device 6 to access the language selection feature (as shown in FIG. 5) to select one of the languages to be used.

In step S822, the portable electronic device 6 transmits the part of the second national table 622 and the machine code to the dashboard device 5. Specifically, in this embodiment, the machine code includes one of the second number of unique language indices that is associated with the language selected by the user.

In turn, in step S823, in response to receipt of the part of the second national table 622 and the machine code, the processor 511 compares the values of the first number and the second number.

When in step S823, the processor 511 determines that the first number is not smaller than the second number, the flow proceeds to step S824. Otherwise, the flow proceeds to step S826.

When it is determined that the first number is not smaller than the second number, it may be deduced that the firmware 5130 of the dashboard device 5 contains at least the same number of (same or more) language packs available for displaying as the application program 621 installed in the portable electronic device 6 (see FIG. 7 for an example). In such a case, in step S824, the processor 511 identifies, in the first national table 5131, a language index that is identical to the one of the second number of unique language indices included in the machine code, since it is assumed that any language pack specified by the machine code is supported by the firmware 5130 of the dashboard device 5.

For example, when the language index "02" is received, in step S824, the processor 511 identifies the language pack that is associated with the language index 02, Traditional Chinese.

Then, in step S825, the processor 511 uses the Traditional Chinese language pack to set the language to be used on the dashboard device 5.

When it is determined that the first number is smaller than the second number, it may be deduced that, the firmware 5130 of the dashboard device 5 does not contain as many language packs available for displaying as those contained in the application program 621 installed in the portable electronic device 6 (see FIG. 3 for an example). In such a case, the processor 511 determines, in step S826, whether a language index that is identical to said one of the second number of unique language indices can be identified in the first national table 5131.

When it is determined that a language index that is identical to said one of the second number of unique language indices can be identified in the first national table 5131, the flow proceeds to step S827, in which the processor 511 uses the language pack that is associated with the identified language index to set the language used on the dashboard device 5.

Otherwise, when it is determined that a language index that is identical to said one of the second number of unique language indices cannot be identified in the first national table 5131 (e.g., when the language index 10, associated with Hebrew, is received in the case of FIG. 3), meaning that the firmware 5130 of the dashboard device 5 does not support displaying the language selected by the user, the flow proceeds to step S828, in which the processor 511 sets the language used on the dashboard device 5 by using a default language pack (e.g., the English language pack).

Similar to the previous embodiment, the processor 511 is further configured to, when it is determined that the first number does not equal to the second number, generate an alert for one of the dashboard device 5 and the portable electronic device 6, notifying that new update for the firmware 5130 of the dashboard device 5 or the application program 621 installed in the portable electronic device 6 may be available.

Figure 9:
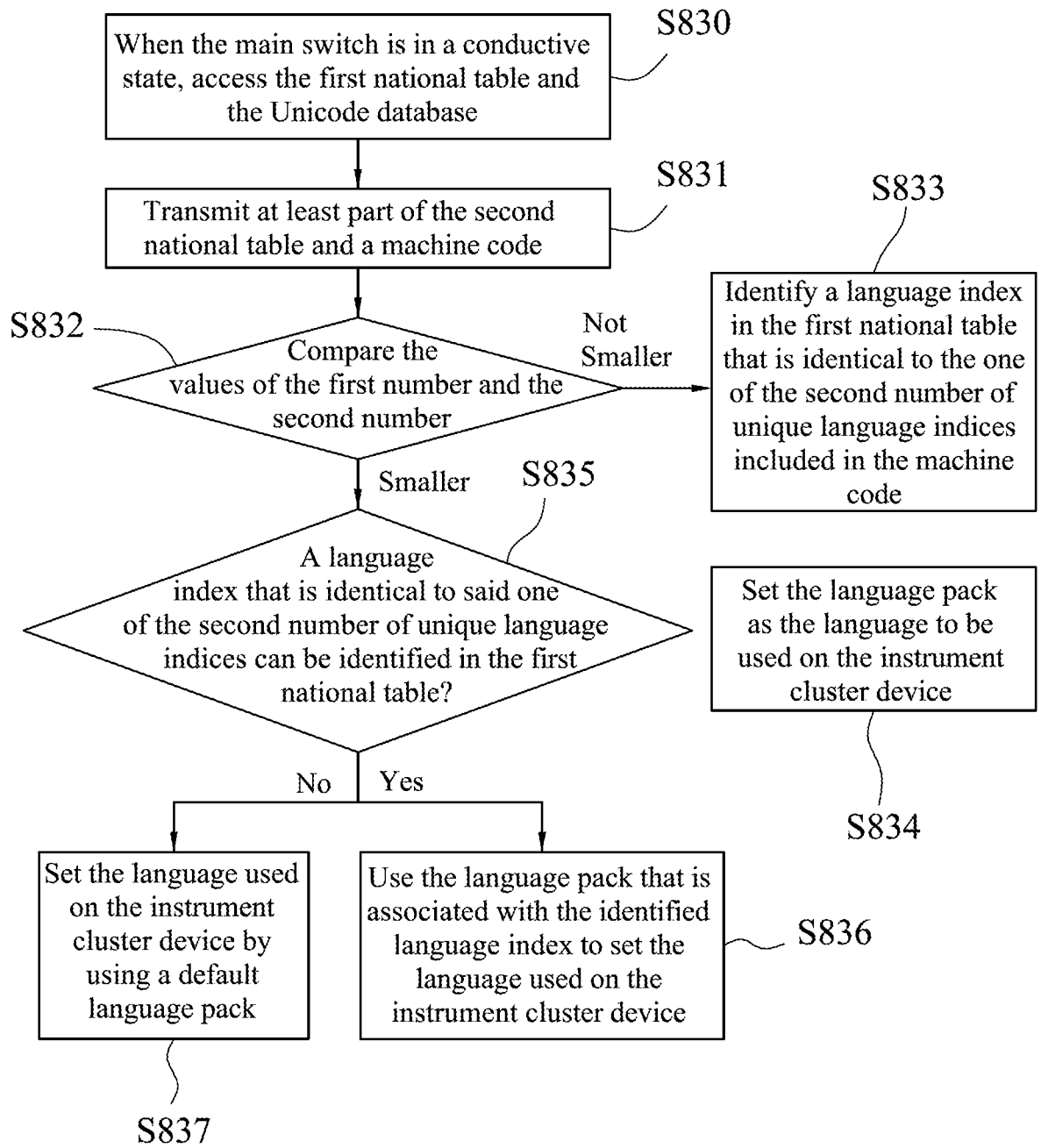
FIG. 9 is a flow chart illustrating steps of a method for setting a language to be used by the dashboard device, according to one embodiment of the disclosure.

FIG. 9 is a flow chart illustrating steps of a method for setting a language to be used by the dashboard device 5, according to one embodiment of the disclosure. The method is implemented by the dashboard device 5 communicating with the portable electronic device 6.

In use, when a user operating the portable electronic device 6 intends to set the language to be used by the dashboard device 5, in step S830, the user may first turn on the main switch 3 of the vehicle 1 (i.e., to switch the main switch 3 to a conductive state, also known as a key-on state), in order to activate the dashboard device 5.

When the main switch 3 is in the key-on state, the processor 511 is capable of accessing the first national table 5131 and the Unicode database 5132, and the communication module 512 of the dashboard device 5 may be controlled to establish communication between the dashboard device 5 and the portable electronic device 6.

Then, in step S831, the portable electronic device 6 transmits the part of the second national table 622 and the machine code to the dashboard device 5. Specifically, the machine code includes one the second number of unique language indices that is associated with a language pack currently used on the portable electronic device 6. For example, for the portable electronic device 6 that is currently using Traditional Chinese, the language index "02" may be transmitted as the machine code. It is noted that the operation of this step may not involve manual operation from the user, and may be automatically done by the processor 511.

In turn, in step S832, in response to receipt of the part of the second national table 622 and the machine code, the processor 511 compares the values of the first number and the second number.

When in step S832, the processor 511 determines that the first number is not smaller than the second number, the flow proceeds to step S833. Otherwise, the flow proceeds to step S835.

When it is determined that the first number is not smaller than the second number, it may be deduced that the firmware 5130 of the dashboard device 5 contains the same number of, if not more, language packs available for displaying than the application installed in the portable electronic device 6 (see FIG. 7 for an example). In such a case, in step 833, the processor 511 identifies a language index in the first national table 5131 that is identical to the one of the second number of unique language indices included in the machine code, since it is assumed that any language pack specified by the machine code is supported by the firmware 5130 of the dashboard device 5.

For example, when the language index "02" is received, in step S833, the processor 511 locates "02" in the column 5133, and identifies the language pack that is associated with the language index 02 to be Traditional Chinese.

Then, in step S834, the processor 511 sets the Traditional Chinese language pack as the language to be used on the dashboard device 5.

When it is determined that the first number is smaller than the second number, it may be deduced that the firmware of the dashboard device 5 does not contain as many language packs available for displaying as the application program 621 installed in the portable electronic device 6 (see FIG. 3 for an example). In such a case, the processor 511 determines whether a language index that is identical to said one of the second number of unique language indices can be identified in the first national table 5131.

When it is determined that a language index that is identical to said one of the second number of unique language indices can be identified in the first national table 5131, the flow proceeds to step S836, in which the processor 511 uses the language pack that is associated with the identified one of the first number of unique language indices to set the language used on the dashboard device 5.

Otherwise, when it is determined that a language index that is identical to said one of the second number of unique language indices cannot be identified in the first national table 5131 (e.g., when the language index 10, associated with Hebrew, is received in the case of FIG. 3), meaning that the firmware 5130 of the dashboard device 5 does not support displaying the language currently used by the portable electronic device 6, the flow proceeds to step S837, in which the processor 511 sets the language used on the dashboard device 5 by using a default language pack (e.g., the English language pack).

Similar to the previous embodiment, the processor 511 is further configured to, when it is determined that the first number does not equal to the second number, generate an alert for one of the dashboard device 5 and the portable electronic device 6, notifying that new update for the firmware 5130 of the dashboard device 5 or the application program 621 installed in the portable electronic device 6 may be available.

To sum up, the embodiments of the disclosure provide a dashboard device 5 that is capable of communicating with a portable electronic device 6, and that is capable of automatically switching a language used for display, based on content of the incoming machine code.

Specifically, when the machine code includes a Unicode code point, the processor 511 identifies a corresponding one of the first number of unique language indices that corresponds to the related Unicode range within which the Unicode code point falls, and uses a language pack that is associated with the corresponding one of the first number of unique language indices to set the language used on the dashboard device 5.

When the machine code includes one of the second number of unique language indices, which may be selected by the user or may correspond to the language that is currently used by the portable electronic device 6, the processor 511 identifies a language index in the first national table 5131 that is identical to said one of the second number of unique language indices included in the machine code, and uses the language pack that is associated with the identified language index to set the language used on the dashboard device 5.

As a result, the operations of setting the language on the dashboard device 5 do not involve the user interacting physically with the dashboard device 5, and may be implemented more easily.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A system for setting a language for a vehicle, comprising:
   a dashboard device included in the vehicle and including
      a storage component that stores a plurality of different language packs and a first national table listing a first number of unique language indices associated respectively with the language packs, and
      a processor that is coupled to said storage component; and
   a portable electronic device electrically connected to said dashboard device and including
      a storage component that stores a second national table listing a second number of unique language indices, and
      a processor electrically connected to said storage component of said portable electronic device;
   wherein said portable electronic device is configured to transmit a machine code and the second number to said dashboard device;
   said processor of said dashboard device is programmed to, in response to receipt of the machine code and the second number, use one of the language packs to set the language used on said dashboard device based on content of the machine code and a relationship between the first and second numbers;
   wherein the system further comprises a main switch that is included in the vehicle and electrically connected to said dashboard device, wherein said portable electronic device is configured to transmit a machine code and the second number to said dashboard device after said main switch is switched to a conductive state, the machine code including a Unicode code point associated with a default character,
   wherein said storage component of said dashboard device further stores a Unicode database having a number of characters and associated Unicode code points, said storage component of said dashboard device stores the first national table to further list a plurality of Unicode ranges that correspond respectively to the first number of unique language indices, and said processor of said dashboard device is programmed to set the language used on said dashboard device by
      comparing the values of the first number and the second number,
      when it is determined that the first number is not smaller than the second number, identifying a related Unicode range within which the Unicode point included in the machine code falls, identifying a corresponding one of the first number of unique language indices that corresponds to the related Unicode range, and using the language pack that is associated with the corresponding one of the first number of unique language indices to set the language used on said dashboard device.

2. The system of claim 1, wherein, when it is determined that the first number is smaller than the second number, said processor of said dashboard device is further programmed to set the language used on said dashboard device by:

determining whether a related Unicode range within which the Unicode code point included in the machine code falls can be identified within the Unicode database; and when it is determined that a related Unicode range can be identified, identifying a corresponding one of the first number of unique language indices that corresponds to the related Unicode range, and using the language pack that is associated with the corresponding one of the first number of unique language indices to set the language used on said dashboard device.

3. The system of claim 2, wherein said processor of said dashboard device is further programmed to, when it is determined that a related Unicode range cannot be identified, set the language used on said dashboard device by using a default language pack.

4. The system of claim 1, wherein said dashboard device further includes a display electrically connected to said processor of said dashboard device, wherein, in response to receipt of the second number from said portable electronic device, said processor of said dashboard device is further programmed to compare values of the first number and the second number, and when it is determined that the first number is larger than the second number, control said display to display an alert message indicating that said portable electronic device should be updated.

5. The system of claim 1, wherein said dashboard device further includes a display electrically connected to said processor of said dashboard device, wherein, in response to receipt of the second number from said portable electronic device, said processor of said dashboard device is further programmed to:

compare values of the first number and the second number; and when it is determined that the first number is smaller than the second number, control said display to display an alert message indicating that firmware of said dashboard device should be updated.

6. A system for setting a language for a vehicle, comprising:

a dashboard device included in the vehicle and including
  a storage component that stores a plurality of different language packs and a first national table listing a first number of unique language indices associated respectively with the language packs, and
  a processor that is coupled to said storage component, and
a portable electronic device electrically connected to said dashboard device and including
  a storage component that stores a second national table listing a second number of unique language indices, and
  a processor electrically connected to said storage component of said portable electronic device;

wherein said portable electronic device is configured to transmit a machine code and the second number to said dashboard device;

said processor of said dashboard device is programmed to, in response to receipt of the machine code and the second number, use one of the language packs to set the language used on said dashboard device based on content of the machine code and a relationship between the first and second numbers;

wherein the system further comprises a main switch that is included in the vehicle and electrically connected to said dashboard device, wherein said portable electronic device is configured to transmit a machine code and the second number to said dashboard device after said main switch is switched to a conductive state, the machine code one of the second number of unique language indices that is associated with a language selected by a user of said portable electronic device, wherein said processor of said dashboard device is programmed to set the language used on said dashboard device by comparing values of the first number and the second number, when it is determined that the first number is not smaller than the second number, identifying, in the first national table, a language index that is identical to said one of the second number of unique language indices included in the machine code, and using the language pack that is associated with the identified language index to set the language used on said dashboard device.

7. The system of claim 6, wherein said processor of said dashboard device is further programmed to, when it is determined that the first number is smaller than the second number, set the language used on said dashboard device by:

determining whether a language index that is identical to said one of the second number of unique language indices can be identified in the first national table; and when it is determined that a language index that is identical to said one of the second number of unique language indices can be identified in the first national table, using a language pack that is associated with the identified language index to set the language used on said dashboard device.

8. The system of claim 7, wherein said processor of said dashboard device is further programmed to, when it is determined that a language index that is identical to said one of the second number of unique language indices cannot be identified in the first national table, set the language used on said dashboard device by using a default language pack.

9. A system for setting a language for a vehicle comprising:

a dashboard device included in the vehicle and including
  a storage component that stores a plurality of different language packs and a first national table listing a first number of unique language indices associated respectively with the language packs, and
  a processor that is coupled to said storage component, and
a portable electronic device electrically connected to said dashboard device and including
  a storage component that stores a second national table listing a second number of unique language indices, and
  a processor electrically connected to said storage component of said portable electronic device;

wherein said portable electronic device is configured to transmit a machine code and the second number to said dashboard device;

said processor of said dashboard device is programmed to, in response to receipt of the machine code and the second number, use one of the language packs to set the language used on said dashboard device based on content of the machine code and a relationship between the first and second numbers;

wherein the system further comprises a main switch that is included in the vehicle and electrically connected to said dashboard device, wherein said portable electronic device is configured to transmit a machine code and the second number to said dashboard device after said main switch is switched to a conductive state, the machine code including one of the second number of unique language indices that is associated with a language pack currently used on said portable electronic device, wherein said processor of said dashboard device is programmed to set the language used on said dashboard device by comparing values of the first number and the second number, and when it is determined that the first number is not smaller than the second number, identifying, in the first national table, a language index that is identical to said one of the second number of unique language indices included in the machine code, and using the language pack that is associated with the identified language index to set the language used on said dashboard device.

10. The system of claim 9, wherein, when it is determined that the first number is smaller than the second number, said processor of said dashboard device is further programmed to set the language used on said dashboard device by:

determining whether a language index that is identical to said one of the second number of unique language indices can be identified in the first national table; and when it is determined that a language index that is identical to said one of the second number of unique language indices can be identified in the first national table, using a language pack that is associated with the identified language index to set the language used on said dashboard device.

11. The system of claim 10, wherein said processor of said dashboard device is further programmed to, when it is determined that a language index that is identical to said one of the second number of unique language indices cannot be identified in the first national table, set the language used on said dashboard device by using a default language pack.

* * * * *

UNITED STATES PATENT AND TRADEMARK OFFICE
CERTIFICATE OF CORRECTION

Page 1 of 1

PATENT NO. : 10,956,183 B2
APPLICATION NO. : 16/257918
DATED : March 23, 2021
INVENTOR(S) : Yi-Yang Tsai and Kuo-Chen Wu It is certified that error appears in the above-identified patent and that said Letters Patent is hereby corrected as shown below:

In the Specification

| | | |
|---|---|---|
| Column 1, | Line 20, | change "Patent No. 1380229" to --Patent No. I380229-- |
| Column 2, | Line 44, | change "all terrain" to --all-terrain-- |
| Column 2, | Lines 50-56, | Revise all lines as follows: --The dashboard device 5 includes a display 50, and a host computer 51 electrically connected to the display 50. The host computer 51 includes a processer 511, a communication module 512 and a storage component 513.-- |
| Column 6, | Line 49, | change "cloud server over" to --cloud server 71 over-- |
| Column 10, | Line 66, | change "Unicode point" to --Unicode code point-- |
| Column 12, | Line 16, | change "code one of" to --code including one of-- |

Signed and Sealed this
Eighth Day of June, 2021

Drew Hirshfeld
*Performing the Functions and Duties of the
Under Secretary of Commerce for Intellectual Property and
Director of the United States Patent and Trademark Office*